June 2, 1925.  
F. H. SCHOFIELD  
TIRE CARRIER AND RIM TOOL  
Filed Dec. 13, 1923
1,540,503
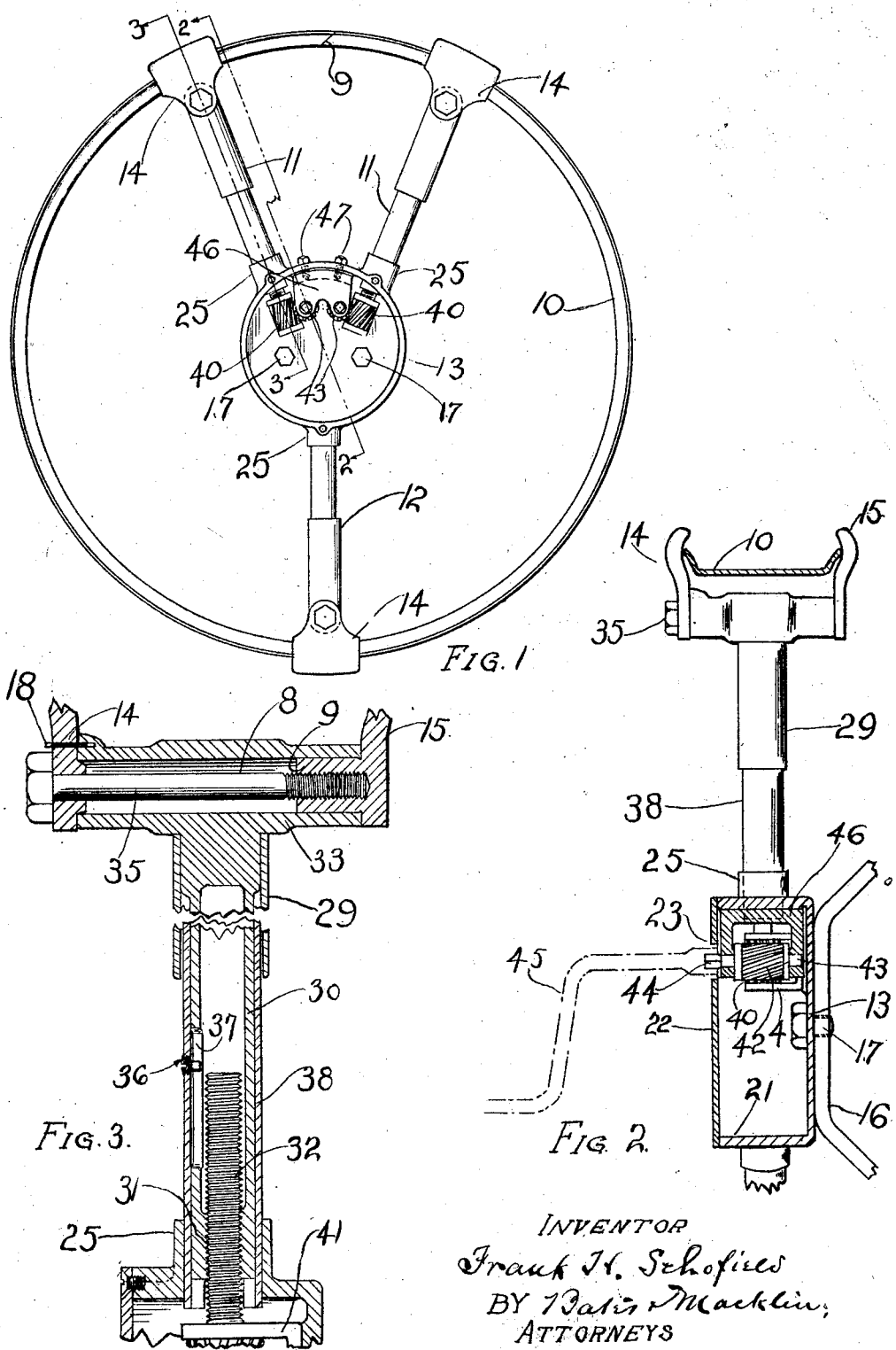
INVENTOR  
Frank H. Schofield  
BY Bates Macklin,  
ATTORNEYS Patented June 2, 1925.

UNITED STATES PATENT OFFICE.

1,540,503

FRANK H. SCHOFIELD, OF CLEVELAND, OHIO, ASSIGNOR TO MARY ELIZABETH COOK, OF CLEVELAND, OHIO.

TIRE CARRIER AND RIM TOOL.

Application filed December 13, 1923. Serial No. 680,366.

*To all whom it may concern:*

Be it known that I, FRANK H. SCHOFIELD, a citizen of the United States, residing at Cleveland, in the county of Cuyahoga and State of Ohio, have invented a certain new and useful Improvement in a Tire Carrier and Rim Tool, of which the following is a full, clear, and exact description, reference being had to the accompanying drawings.

This invention relates to a combined automobile tire carrier and rim remover which may be conveniently mounted on an automobile in such position that it may be readily accessible for the purposes intended.

Rim expanding tools embodying a plurality of rim engaging arms have heretofore been used, and have been so positioned on an automobile that they may be adapted for use as a tire carrier. One type of tool comprises a plurality of movable arms and a gear common to all for moving the arms radially to clamp or expand the rims. An objection to this construction is the difficulty of obtaining sufficient power for actuating the device to collapse a rim, and also to provide for movement of one end of the rim past the other.

One of the objects of my invention, therefore, is the provision of a combined tire carrier and rim tool which requires but little effort to operate, and which may be satisfactorily actuated to cause one end of a rim to slide past the other.

A further object of the present invention is the provision of a device which shall be simple, durable and relatively inexpensive in construction, and effective and reliable in operation. In this connection my invention contemplates the provision of a tool which may be readily attached to an automobile.

The means for carrying out the above objects, will hereinafter be fully set forth in the following description which pertains to the accompanying drawings. The essential characteristics will be summarized in the claims.

In the drawing Fig. 1 is a front elevation of a device made in accordance with my invention; Fig. 2 is a section taken on the line 2—2 in Fig. 1; and Fig. 3 is a section taken on an enlarged scale through one of the movable arms.

In Fig. 1, my invention is shown as attached to a rim 10 and as having a pair of movable telescopic arms 11 and a fixed arm 12 which are centrally connected by a hub or casing 13. Gripping devices 14 and 15 are carried at the end of the respective arms for engaging and clamping a rim.

The casing preferably comprises a back plate 20, which is adapted to be attached as by securing members 17 to a bracket 16 on an automobile and a flange 21 which is preferably integral with the back plate. A cover plate 22 may be secured across the front of the flange and may have an opening 23 therein for permitting access to the arm actuating mechanism. The casing is moreover shown as having spaced hubs 25 which are arranged to receive the movable arms 11, and fixed arm 12, respectively.

Each arm preferably comprises an outer sleeve 29 and an inner sleeve 30 which are sufficiently spaced from each other to permit the passage of an intermediate sleeve 38 therebetween. Each intermediate sleeve is rigidly connected at one end thereof to a hub 25 and has sufficient length to extend between the inner and outer sleeve when the arms are in extended position. These interfitting sleeves provide a tool which is neat in appearance, and which prevents the accumulation of dust and dirt within the operating mechanism.

Each movable arm may have the associated sleeve 30 threaded, as at 31, to engage a correspondingly threaded spindle 32. Each sleeve 30 may then be prevented from rotation, by a pin and slot connected as embodied in a threaded member 36 carried by the sleeve 38 and a slot 37 in the sleeve 30.

To rotate each spindle 32 and thereby to move each sleeve 30 radially with reference to the casing I employ a spiral gear 40 which is rigidly attached to each spindle 32 and is supported in a bearing block 41. This block may be a U-shaped member having the intermediate portion thereof attached to the back plate 20. A driving spiral gear 42 is adapted to mesh with each gear 40 and is mounted on a shaft 43, the outer end of which is shaped as at 44 to receive a wrench 45. Each shaft 43 may be supported in a U-shaped block, the intermediate portion of which is curved to engage the inner wall of the flange 21. Suitable securing members 47 may be used for positioning the block 46.

To prevent pivotal movement of each clamping jaw with reference to the associated head 33, I may provide a rigid connection between the jaw 15, as by a press fit between a shank 9 and the walls of an opening 8 in the head. Each cooperating jaw 14 is arranged to receive a bolt 35, the inner end of which is threaded and is adapted to enter a threaded opening in the shank 9. Moreover each jaw is prevented from moving about the axis of the bolt as a pivot, by a pin 18 which is rigidly connected to the heads and is adapted to extend into an opening in the jaw as shown in Fig. 3.

To operate a rim tool made in accordance with my invention, the rim is so positioned thereon that a movable arm is disposed on each side of the joint 9. In this position the clamping jaws 14 are locked to the rim as shown in Fig. 1. Then to collapse the rim, a wrench 45 is attached to one of the shafts 43 and is actuated to rotate the spiral gear 42 in such direction that the associated movable arm is moved inwardly.

After one end of the rim is moved beyond the other end sufficiently to permit one end to slide past the other, then the wrench may be brought into engagement with the other shaft 43 wherefore the second movable arm may be drawn inwardly with reference to the first one. Thus each arm may be moved independently of the other and the rim may be quickly collapsed or expanded with a minimum effort.

I claim:

1. In combination, a plurality of spaced arms, a hollow casing connecting said arms, one of said arms being movable radially with reference to another of said arms, gearing within the casing for actuating each arm, said gearing being so arranged that either arm may be moved with relation to the other and independently of the other.

2. In a device of the character described, the combination with a plurality of radially disposed telescopic arms, a pair of jaws carried by each arm for engaging and gripping a rim, one of said jaws being stationary and the other being movable with reference to the associated arm, a recessed hub connecting said arms, and mechanism within the hub for moving one arm independently of another arm.

3. In combination, a hub, two threaded spindles carried thereby, a spiral gear carried by each spindle, independently operable spiral gears within said hub for enabling one spindle to be rotated independently of the other, an arm associated with each spindle, each arm comprising a head having an inner sleeve and an outer sleeve associated therewith, the inner sleeve being in threaded engagement with the associated spindle, a stationary sleeve carried by the hub and extending between the first mentioned sleeves, a pair of jaws carried by each head, one of said jaws being rigidly attached to the head and the other of said jaws being slidable on the head, and means for adjustably positioning the movable jaw on the head for engaging and clamping a rim.

In testimony whereof, I hereunto affix my signature.

FRANK H. SCHOFIELD.